3,180,611
VALVE MECHANISMS
Wolfgang Wieland, Jacksonville, Fla., assignor to
James M. Dudley, Jacksonville, Fla.
Filed Dec. 21, 1962, Ser. No. 246,547
10 Claims. (Cl. 251—304)

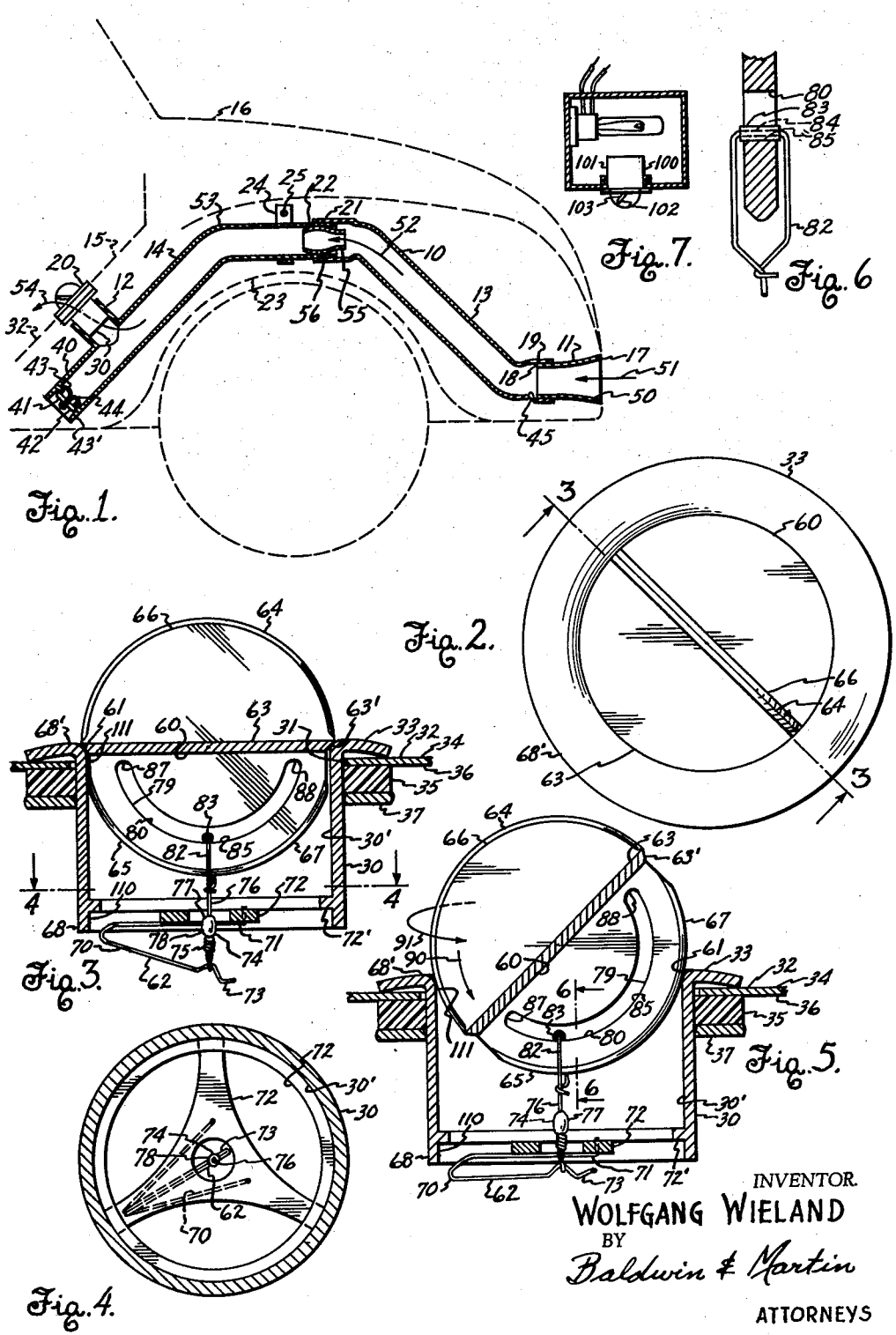

This invention relates to valve and more particularly to improved valve mechanisms.

A general object of the present invention is to provide an improved valve mechanism.

Another general object of the invention is the provision of an improved universal valve mechanism.

A further general object of the present invention is to provide an effective fluid valve mechanism, particularly mechanisms for use in an air ventilation system.

A particular object of the present invention is the provision of valve mechanisms to be used in vehicle ventilation systems which adequately provide a supply of fresh air to the interior passenger compartment of the vehicle.

An additional particular object of the present invention is to provide an air valve mechanism in which the air stream may be adjusted in any direction or angle without materially reducing the volume or amount of air which passes through the valve, and the volume of the air stream is selectively controllable.

A specific object of the present invention is the provision of an improved air valve in a vehicle ventilation system which is manually operable for individual comfort of the driver and passengers within the vehicle.

Additional specific objects are to provide fluid valve mechanisms which are economical, simple and compact in construction, easy in installation and efficient in operation.

Still another object of the invention is to provide a fluid valve which is noiseless in operation and which operates effectively in any position in which the valve is set.

The novel features which are believed to be characteristic of this invention are set forth with particularity in the appended claims. The invention itself, however, both as to its organization and method of operation, together with further objects and advantages thereof, may best be understood by reference to the following description taken in connection with the accompanying drawing, in which:

FIG. 1 is a side elevational view of the air ventilating system including a fluid valve mechanism of the invention, a portion of a vehicle being represented by broken lines;

FIG. 2 is a front plan view of the fluid valve mechanism of FIG. 1;

FIG. 3 is a transverse sectional view taken along line 3—3 of FIG. 2, showing the valve element in its closed position;

FIG. 4 is a transverse sectional view taken along line line 4—4 of FIG. 3;

FIG. 5 is a view similar to FIG. 3 showing the valve element in one of its opened positions;

FIG. 6 is an enlarged transverse sectional view taken along line 6—6 of FIG. 5, and FIG. 7 is a side elevational view of a valve mechanism in accordance with the invention for the control of light.

Referring now more particularly to the drawing, the air ventilating system is generally depicted at 10 in FIGURE 1 and comprises an air inlet 11, an air outlet 12 and ducts or conduits 13 and 14 interconnecting inlet 11 and outlet 12, outlet 12 communicating with the interior passenger compartment 15 of vehicle 16, shown by broken lines, through valve mechanism 20. The inlet or air scoop 11 is attached by suitable means (now shown) to the vehicle 16 at the inlet forward end 17. The rearward end 18 of inlet 11 telescopes within the forward end portion 19 of conduit 13 and the rearward end 21 of conduit 13 telescopes over the forward end 22 of conduit 14. Conduits 13 and 14 are disposed within one of the front wheel wells 23 of the vehicle 16 and a strap 24 is wrapped around conduit end portion 22 and is secured to vehicle 16 by fastener 25.

It is to be specifically understood that the normal vehicle is provided with a pair of ventilating systems, and another system having substantially identical parts, as hereinbefore described with reference to system 10 and hereafter more fully described, is disposed on the other side of vehicle 16 under the other front wheel well.

The air outlet 12 extends substantially perpendicular to the longitudinal axis of conduit 14, as indicated, and valve shank or housing 30 telescopes within outlet 12. Valve housing 30 is mounted through fire wall 32 of vehicle 16 by sliding housing 30 through fire wall opening 31 until flange 33 contacts the interior face 34 of the vehicle fire wall 32. Thereafter, a gasket 35 is positioned around the housing 30 below fire wall 32 in contiguous relation with the exterior face 36 of fire wall 32, and a force fit locking ring 37 is positioned around housing 30 and moved toward gasket 35 until the fire wall 32 around opening 31 and gasket 35 are securely nested between flange 33 and ring 37.

A water discharge passageway 45 extends transversely through conduit 13 adjacent inlet 11 in order that entrained water entering the air inlet opening 50 may be discharged through passageway 45 and any water which may accumulate within conduit 13 may also be discharged therethrough. The air enters opening 50, as indicated by the horizontal arrow 51, the air thereafter travels inclinedly upwardly through conduit 13, as indicated by arrow 52, passes through a horizontally disposed portion 53 of conduit 14, passes inclinedly downwardly through conduit 14 and thereafter passes perpendicularly, with respect to conduit 14, through outlet 12 and valve 20 into the interior passenger compartment 15, as indicated by arrow 54. Substantially all the entrained water which accumulates in conduit 14 is automatically discharged through water discharge valve 41. Discharge valve 41 is positioned below outlet 12 at the lower end 40 of conduit 12 and comprises a valve element 42, a valve seat 43, and a spring 44 yieldably maintaining valve element 42 closed against seat 43. It is to be noted that a constriction unit or water baffle 55 is interposed within conduit end portion 22 to block off the outer ring of air, and particularly the lower portion of the outer ring of air, in order that the inner dry core of air be passed into the passenger compartment while the outer ring of air, having a greater water content, is excluded. Any water accumulating within conduit 13 is also substantially prevented from passing into conduit 14 thereby providing the passenger compartment 15 with dry air. The provision of the water discharge passageway 45, the water baffle 55, the air outlet 12 perpendicular to conduit 14, and water discharge valve 41 is effective to substantially exclude any entrained water in the air from entering passenger compartment 15.

The telescoping connections of inlet 11, conduits 13 and 14 and valve housing 30 are all force fit connections, however, screw connections or the like may be used if desired. It has been found that conduits made of thermo-setting rosinous material have been particularly adaptable for use in this ventilating system 10 wherein the conduits are interconnected by the telescoping force fit method. The constriction unit or baffle 55 is formed and shaped to telescope within conduit end portion 22 and a sealer may be provided at 56 between constriction unit 55 and conduit end portion 22 to securely affix the unit therewithin. The valve seal 43 of valve 41 may be constructed by placing a disc 43' within conduit end portion 40 and applying a sealer therearound.

Referring now to FIGURES 3-6, the valve mechanism 20 in accordance with the invention is clearly shown wherein mechanism 20 comprises a housing 30, a universally selectable valve element 60, a valve seat 61, a resilient means 62 connected to valve element 60 for yieldably retaining valve element 60 in any one of its universally selected opened and closed positions. Valve element 60 comprises a substantially circular plate 63 which seats on a substantially circular valve seat 61, and a member 64 is attached to plate 63 and extends substantially perpendicularly thereto and forms a generally circular outer edge 65. The circumference of the outer edge 63' of plate 63 and the circumference of outer edge 65 of member 64 are substantially equal. Member 64 includes an upper portion 66 extending above valve plate 63 providing a manually graspable handle for selectively moving valve plate 63 from its closed seated portion on valve seat 61 to any of its universally opened positions, hereinbelow more fully described. Member 64 further includes a lower portion 67 extending below the valve plate 63 into housing chamber 30'.

Resilient means 62 are connected between housing 30 adjacent its inlet end portion 68 and the lower portion 67 of member 64 for yieldably retaining valve plate 63 in any one of its selected universally opened and closed positions. Resilient means 62 comprise an enlongated spring 70 having one of its end portions 71 connected to an insert 72, insert 72 being affixed to a disc 72' attached to housing 30 at its lower end portion 68. End portion 73 of spring 70 is connected to lower portion 67 of member 64 by connection means 74.

Connection means 74 includes link 75 connected to end portion 73 of spring 70 and link 76 connected to lower portion 67 of member 64, links 75 and 76 having adjacent independent end portions (not shown) disposed within casing or swivel connector 77 and freely movable therein thereby forming a swivel connection 78 to allow valve element 60 to be freely rotatable without rotating and contorting spring 70.

Link 76 is specifically shown in FIGS. 3, 5 and 6 to extend through an arcuate slot 80 and is crimped back on itself to form a loop 82 extending around ring portion 79 of lower portion 67 between slot 80 and circular edge 65. A roller sleeve 83 surrounds link portion 84 and bears against and rolls along the inner face 85 of ring portion 79. Arcuate slot 80 extends through lower portion 67 of member 64 substantially parallel to outer edge 65 thereof, and the slot 80 terminates at ends 87 and 88 substantially adjacent valve plate 63 to permit greater adjustability of the valve.

In order that the valve element 60 be opened, one grasps the handle 66, lifts valve plate 63 from its seat 61 and rotates valve element 60 in the direction shown by arrow 90 in FIG. 5, or the valve element could, of course, be rotated in the opposite direction to similarly dislodge the plate 63 from its seat 61. The direction of the fluid flowing through valve mechanism 20 can be determined by rotating valve element 60 in the direction indicated by arrow 91 or in the opposite direction thereof. When the valve element moves from its closed position shown in FIG. 3 to one of its selected opened positions indicated in FIG. 5, sleeve 84 moves along face 85 of ring portion 79 towards the slot end 87. It is obvious that when valve element 60 is rotated in a direction opposite to the arrow 90 the sleeve 84 will move toward slot end 88.

The provision of the swivel connection 78 between valve element 60 and spring 70 permits rotation of valve element 60 in the direction indicated by arrow 91 or in a direction opposite thereto without adversely affecting or damaging spring 70 and permits a greater latitude of universal adjustability of valve element 60. When valve element 60 is lifted excessively, end portion 73 functions as a stop or limit against insert 72 to prevent such excessive lifting and thereby prevents stretching of the spring 70 beyond its elastic limit.

Valve 100 in FIG. 7 is substantially identical to valve 20 previously described in connection with FIGS. 1-6, however, valve 100 is used as a light valve. The operation of light valve 100 is substantially the same as the operation of valve 20. It is to be understood that light valve 100 includes an opaque housing 101 and an opaque valve plate 102 which is preferably reflective or a reflective coating 103 may be placed beneath plate 102.

The valve means 20, in accordance with the present invention, comprise a substantial cylindrical housing 30 having opposite end portions 68 and 68', a chamber 30' therebetween, an inlet passageway 110 through end portion 68 and an outlet passageway 111 through end portion 68', the inlet passageway 110 and outlet passageway 111 being interconnected by chamber 30'. The housing 30 includes a valve seat portion 61 of a generally circular configuration. Valve element 60 comprises a generally circular valve plate 63, wherein valve plate 63 includes a generally circular outer edge 63', and valve element 60 is disposed within the outlet passageway 111 with outer edge 63' nestable on valve seat portion 16 when plate 63 is in its closed position transversely of the outlet passageway 111. A member 64 is attached to the valve plate 63 and extends substantially perpendicular thereof and forms a generally circular outer edge 65, the circumference of the circular outer edge 63' of plate 63 and the circumference of the circular outer edge 65 of member 64 being substantially equal. The portion 66 of member 64 about valve plate 63, when the valve plate 63 is in its closed position, provides a manually graspable handle for selectively moving valve plate 63 from its closed position shown in FIG. 3 to any of its universally opened positions, one such position being shown in FIG. 5 and another being shown in FIG. 1. The resilient means 62 the connected by insert 72 and disc 73 to housing 30 adjacent end portion 68' and are connected to lower portion 67 of member 64 for yieldably retaining valve plate 63 in any one of its selected universally opened and closed positions. The resilient means 62 further includes a swivel connection attaching spring 70 to lower portion 67 of member 64 to permit unobstructed adjustability of valve element 60 as hereinbefore set forth.

While only a certain preferred embodiment of this invention has been shown and described by way of illustration, many modifications will occur to those skilled in the art and it is, therefore, desired that it be understood that it is intended in the appended claims to cover all such modifications as fall within the true spirit and scope of this invention.

What is claimed as new and what it is desired to secure by Letters Patent of the United States is:

1. A valve mechanism having a valve seat portion of a generally circular configuration, a universal valve element including a generally circular valve plate conforming to the configuration of said valve seat portion, forcible means for yieldably urging said valve plate toward and seated on said valve seat portion, said valve element further including means attached to said valve plate and extending above and below said valve plate and forming a generally circular outer edge, said means having a diameter greater than the diameter of said valve seat, said means above said valve plate forming a manually graspable handle and being graspable for selectively moving said valve plate upwardly off said valve seat portion against the force of said forcible means and for selectively rotating said valve element to any of its universally opened positions, said forcible means being operative upon release of said handle to yieldably urge said valve element in any of its selected universally opened positions on said valve seat portion.

2. A valve mechanism comprising a substantially cylindrical housing having opposite end portions and a chamber between its said end portions, an inlet passageway at one said end portion, an outlet passageway at the other said end portion, said inlet passageway and outlet passageway being interconnected by said chamber, said other end portion of said housing having a valve seat of a generally circular configuration, a universally adjustable valve element disposed within said outlet passageway and having a generally circular valve plate conforming to the configuration of said valve seat, said valve plate having a generally circular outer edge nestable on said valve seat when said plate is in its closed position transversely of said outlet passageway, a member attached to said valve plate and extending substantially perpendicular thereto and forming a generally circular outer edge, the circumference of said outer edge of said valve plate and the circumference of said outer edge of said member being substantially equal, said member having an upper portion above said valve plate and a lower portion therebelow when said valve plate is in its closed position seated on said valve seat, said upper portion providing a manually graspable handle for adjustably and selectively moving said valve plate partly outwardly of said housing and from its said closed position to any of its universally opened positions, resilient means connected between said housing adjacent said one end portion and said lower portion of said member for yieldably retaining said valve plate in any one of its selected universally opened and closed positions, said resilient means including a spring attached to said housing and connection means attaching said spring to said lower portion of said member.

3. A valve mechanism comprising a substantially cylindrical housing having opposite end portions and a chamber between its said end portions, an inlet passageway at one said end portion, an outlet passageway at the other said end portion, said inlet passageway and outlet passageway being interconnected by said chamber, said other end portion of said housing including a valve seat of a generally circular configuration, a valve element disposed within said outlet passageway and having a generally circular valve plate, said valve plate having a generally circular outer edge substantially conforming to and nestable on said valve seat when said plate is in its closed position transversely of said outlet passageway, a member attached to said valve plate and extending substantially perpendicular thereof and forming a generally circular outer edge, the circumference of said outer edge of said valve plate and the circumference of said outer edge of said member being substantially equal, said member having an upper portion above said valve plate forming a manually graspable handle for moving said valve plate from its closed position seated on said valve seat to any of its universally opened positions, said member further having a lower portion below said valve plate, resilient means connected between said housing adjacent said one end portion and said lower portion of said member for yieldably retaining said valve element in any one of its selected universally opened and closed positions, said lower portion of said plate including an arcuate slot, said resilient means including a spring attached to said housing and connection means extending through said slot and slidable therealong for attaching said spring to said lower portion of said member.

4. A valve mechanism comprising a substantially cylindrical housing having opposite end portions and a chamber between its said end portions, an inlet passageway at one said end portion, an outlet passageway at the other said end portion, said inlet passageway and outlet passageway being interconnected by said chamber, said other end portion of said housing having a valve seat of a generally circular configuration, a universally adjustable valve element disposed within said outlet passageway and having a generally circular valve plate conforming to the configuration of said valve seat, said valve plate having a generally circular outer edge nestable on said valve seat when said plate is in its closed position transversely of said outlet passageway, a member attached to said valve plate and extending substantially perpendicular thereto and forming a generally circular outer edge, the circumference of said outer edge of said valve plate and the circumference of said outer edge of said member being substantially equal, said member having an upper portion above said valve plate and a lower portion therebelow when said valve plate is in its closed position seated on said valve seat, said upper portion providing a manually graspable handle for adjustably and selectively moving said valve plate from its said closed position to any of its universally opened positions, resilient means connected between said housing adjacent said one end portion and said lower portion of said member for yieldably retaining said valve plate in any one of its selected universally opened and closed positions, said resilient means including a spring and a swivel attaching said lower portion of said member to said housing, said swivel permitting greater adjustability and preventing contortion of said spring during adjustment of said valve element.

5. A valve mechanism as defined in claim 4 wherein said lower portion of said member further includes an arcuate slot substantially parallel to said outer edge of said member, said arcuate slot having respective ends terminating adjacent said valve plate, said resilient means further including a link extending through said slot and movable therealong between its said ends during adjustment of said valve element.

6. A valve mechanism as defined in claim 4 wherein said housing further includes an insert extending into said chamber, said spring having one end connected to said housing and another end connected to said swivel, said other end of said spring contacting said insert and limiting the outward movement of said valve element during adjustment thereof thereby preventing stretching of said spring beyond its elastic limit, said lower portion of said member further includes an arcuate slot substantially parallel to said outer edge of said member, said arcuate slot having respective ends terminating adjacent said valve plate, said resilient means further including a link extending through said slot and movable therealong between its said ends during adjustment of said valve element.

7. A valve mechanism comprising a substantially cylindrical housing having opposite end portions and a chamber between its said end portions, an inlet passageway at one said end portion, an outlet passageway at the other said end portion, said inlet passageway and outlet passageway being interconnected by said chamber, said other end portion of said housing having a valve seat portion of a generally circular configuration, a universal valve element disposed within said outlet passageway and having a generally circular valve plate conforming to the configuration of said valve seat portion, said valve plate having a generally circular outer edge nestable on said valve seat portion when said plate is in its closed position transversely of said outlet passageway, a member attached to said valve plate and extending therefrom and forming a generally circular outer edge, the circumference of said outer edge of said valve plate and the circumference of said outer edge of said member being substantially equal, said member having an upper portion extending above said valve plate and lower portion extending below said valve plate when said valve plate is in its closed position entirely seated on said valve seat and said upper portion providing a manually graspable handle for selectively moving said valve plate from its said closed position to any of its universally opened positions, resilient means connected between said housing adjacent said one end portion and the said lower portion of said member for yieldably retaining said valve plate in any one of its selected universally opened and closed positions, said resilient means comprising a spring, a limiting stop for said spring to prevent excessive stretching thereof beyond its elastic limit, and a swivel connected to said spring for permitting independent adjustment of said valve element while preventing contortion of said spring.

8. A valve mechanism comprising a substantially cylindrical housing having opposite end portions and a chamber between its said end portions, an inlet passageway at one said end portion, an outlet passageway at the other said end portion, said inlet passageway and outlet passageway being interconnected by said chamber, said other end portion of said housing including a valve seat of a generally circular configuration, a valve element disposed within said outlet passageway and having a generally circular valve plate, said valve plate having a generally circular outer edge substantially conforming to and nestable on said valve seat when said plate is in its closed position transversely of said outlet passageway, a member attached to said valve plate and extending therefrom and having a generally circular outer edge substantially equal in circumference to the circumference of said outer edge of said valve plate, said member having an upper portion above said valve plate forming a manually graspable handle for moving said valve plate from its closed position seated on said valve seat to any of its universally opened positions, said member further having a lower portion below said valve plate, resilient means connecting said lower portion of said member to said housing adjacent its said one end portion for yieldably retaining said valve element in any one of its selected universally opened and closed positions, said resilient means including a spring, a swivel, and connection means attaching said spring and swivel between said lower portion of said member and said housing.

9. The valve mechanism as defined in claim 8 wherein said resilient means further includes a stop to prevent the stretching of said spring beyond its elastic limit during adjustment of said valve element.

10. The valve mechanism as defined in claim 8 wherein said lower portion of said plate includes an arcuate slot, said resilient means further comprising a link extending through said slot and connected to said housing by said swivel and spring.

References Cited by the Examiner
UNITED STATES PATENTS

| | | | |
|---|---|---|---|
| 2,070,113 | 2/37 | Burgess | 98—2.1 |
| 2,588,626 | 3/52 | Fourtier | 98—40 |
| 2,791,957 | 5/57 | Wendela | 98—2.4 |

ROBERT A. O'LEARY, *Primary Examiner.*

MEYER PERLIN, EDWARD J. MICHAEL, *Examiners.*